United States Patent [19]

Hill et al.

[11] 4,097,820
[45] Jun. 27, 1978

[54] LASERS

[75] Inventors: Roland John Hill, Quarndon; Robert Bryn Price, Burton-on-Trent; Norman Thomas Jewell, Countesthorpe, all of England

[73] Assignee: Rolls-Royce Limited, London, England

[21] Appl. No.: 761,206

[22] Filed: Jan. 21, 1977

Related U.S. Application Data

[63] Continuation of Ser. No. 576,542, May 12, 1975, which is a continuation-in-part of Ser. No. 325,832, Jan. 22, 1973, abandoned.

[30] Foreign Application Priority Data

Jan. 26, 1972 United Kingdom ................. 3801/72

[51] Int. Cl.² .............................................. H01S 3/02
[52] U.S. Cl. ........................... 331/94.5 G; 331/94.5 D
[58] Field of Search ..................... 331/94.5 G, 94.5 P, 331/94.5 D; 330/4.3; 60/249, 39.76, 39.77

[56] References Cited

U.S. PATENT DOCUMENTS

| 3,588,298 | 6/1971 | Edwards | 60/39.77 |
| 3,904,985 | 9/1975 | Robinson et al. | 331/94.5 G |

FOREIGN PATENT DOCUMENTS 1,069,217  5/1967  United Kingdom ............... 60/39.77

Primary Examiner—William L. Sikes
Attorney, Agent, or Firm—Cushman, Darby & Cushman

[57] ABSTRACT

A laser resonator is combined with a circuitous detonation channel to which is fed a suitable explosive gas mixture. The gas mixture is ignited, thereby creating travelling detonation waves which are maintained in circulation around the detonation channel. A population inversion is produced in the detonation product by exhausting the products via a convergent-divergent supersonic expansion nozzle. The products then pass through the laser resonator. At least one substantially linear portion is formed in a detonation channel circuit with the supersonic expansion nozzle being formed in this section of the detonation channel. The optical axis of the laser resonator is oriented to be substantially parallel to a slit nozzle which forms the supersonic expansion nozzle to thereby achieve a large ratio of active length to diameter of the laser resonator.

4 Claims, 12 Drawing Figures

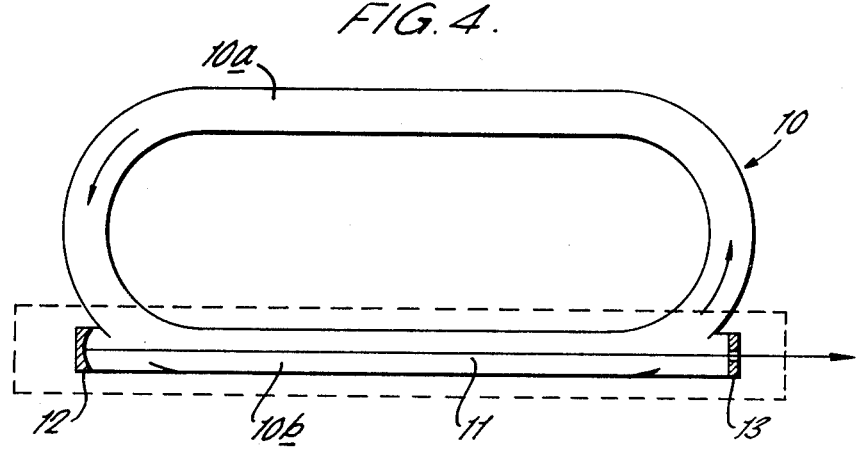
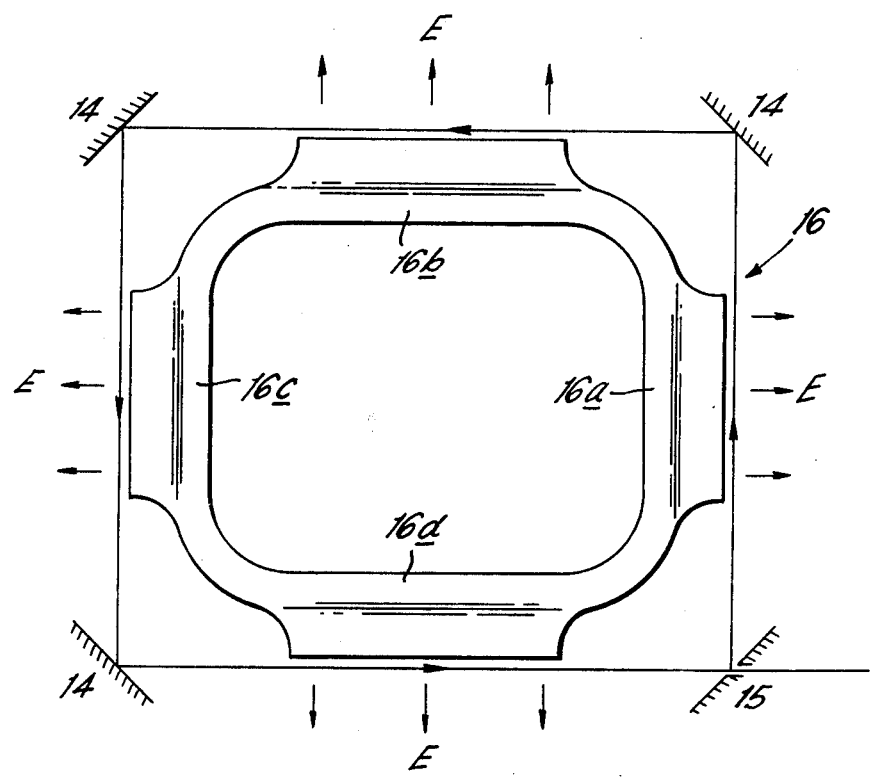

LASERS

This application is a continuation of application Ser. No. 576,542, filed May 12, 1975, which in turn is a continuation-in-part of application Ser. No. 325,832, filed Jan. 22, 1973, now abandoned.

BACKGROUND OF THE INVENTION

This invention relates to a method of producing a coherent beam of electro-magnetic radiation by inducing laser action in a gaseous medium. In particular, it relates to gas dynamically induced lasing in a gaseous medium where the gaseous medium is produced by apparatus which maintains continuous detonation in a combustible gaseous mixture or aerosol by means of at least one detonation wave therein. The term "detonation wave" is intended to mean a combustion process or chemical reaction propagating at a speed greater than the speed of sound in the medium ahead of it.

Certain gases may be used as lasing mediums in a variety of ways; for example, in our co-pending U.S. patent application number 272,842, now U.S. Pat. No. 3,899,749, we described techniques whereby gas turbines may be utilised to support laser action by rapidly expanding their combustion gases (plus additives if necessary) and amplifying any resultant optical activity in an optical resonator. Such optical activity results from a population inversion caused mainly by rapid expansion of the gases. Lasers using this principle are termed "gas-dynamic" lasers. The present invention utilises detonation waves to produce combustion gases suitable for powering a gas dynamic laser.

In gas dynamic lasers, it would obviously be desirable if in addition to the anomalous vibrational energy "frozen" into the gases during supersonic expansion, an additional source of unequilibrated vibrational energy were to be available for the producing of the population inversion, thus increasing the potential power of the laser. It will be explained how the present invention could achieve this desirable result by using detonation waves.

It is known to produce short duration pulses of laser power by means of shock waves in shock tubes and detonations in detonation tubes - see, for example, the paper entitled "SHOCK TUBE LASERS" by Russell, Christiansen and Hertzberg of the University of Washington, Seattle, Washington, U.S.A.

In the detonation-wave powered gas dynamic laser, the reactants are pre-mixed under conditions in which there is little if any reaction until they are triggered by an external source, such as a shock-wave, detonation wave, or an electrical discharge. So far as is known, no travelling detonation-wave powered laser has yet been operated in the continuous wave mode (as opposed to the pulsed mode, in which the laser beam is produced only intermittently). It is an object of this invention to facilitate the production of both pulsed and continuous-wave laser beams, especially high power laser beams, and this is done by utilizing apparatus in which travelling detonation waves can be sustained for any desired period of time and the combustion products used to power a gas dynamic laser.

SUMMARY OF THE INVENTION

According to the present invention, there is provided a method of inducing lasing in a gaseous medium by causing at least one combustion-initiating detonation wave to circulate in at least one endless combustion channel for a controlled period of time, and amplifying the electromagnetic wave emissions of the combustion gases in an electromagnetic wave resonator means.

Also according to the invention, apparatus for inducing lasing in a gaseous medium comprises at least one endless combustion chamber adapted to support at least one continuously circulating combustion-initiating detonation wave for a controlled period of time, and electromagnetic-wave resonator means for amplifying electromagnetic wave emissions of the combustion gases.

The combustion channel may be annular in configuration. Alternatively, non-circular configurations may be used.

Lasing is induced while the combustion reaction is still proceeding, after expansion of the combustion gases through convergent-divergent nozzle means, the lasing being induced gas-dynamically, perhaps with some assistance from non-equilibrated vibrational modes produced by the combustion reaction as hereinafter described.

In a preferred embodiment, a non-circular (circuitous) configuration of combustion channel is used, the channel including at least one substantially linear portion the exhaust gases from the linear portions being expanded through convergent-divergent means and then passed through the laser resonator.

In another preferred embodiment, the exhaust gases from a plurality of substantially linear mutually parallel portions of the detonating channel are caused to expand into a common plenum chamber, said chamber being utilized as part of the resonator to induce lasing.

Other embodiments will be described and claimed.

DISCUSSION OF THEORY OF INVENTION

A detonation wave consists essentially of a strong shock wave very closely followed by a reaction zone; the shock front heats a detonatable gas mixture to a high temperature which is above the spontaneous thermal ignition temperature and the heat liberated in the combustion process provides the energy to maintain the shock front.

It is known that the energy released by the fast chemical reactions occurring in the reaction zone of a detonation wave is not immediately distributed among the available energy modes of the gases (namely vibrational, rotational and translational) in the same way as in mixture in thermodynamic equilibrium. The vibrational energy content of the product molecules when just formed can be significantly higher than the vibrational energy content at equilibrium and it is possible that the excess vibrational energy can be utilized in a "gas dynamic" laser to give improved performance compared with equilibrium conditions, the product molecules of the detonation wave being rapidly expanded to produce a population inversion. In order that this help be given to a gas dynamic laser, it is necessary for the gases to undergo the expansion process before the energy in the vibrational mode has had time to equilibrate with the rotational and translational energy. Stated another way, the excess vibrational energy must be effectively frozen in the reservoir of product gases behind the detonation wave prior to the supersonic expansion. The gas in this state would then be made to expand supersonically through a convergent-divergent nozzle so that a population inversion is otained in the normal "gas dynamic" manner.

The rate at which equilibration of the energy among the different modes is achieved is critically dependent upon the static pressure behind the detonation wavefront. The higher the pressure, the shorter the time for which a population inversion will persist in the product molecules. Thus, post detonation static pressure must be low for the excess vibrational energy to be gainfully exploited in the gas dynamic laser operation.

While gas dynamic processes may be employed to give a single pulse of laser energy from a single detonation, as produced for example with the aid of laboratory detonation tubes, for extended use a continuous detonation is required.

Embodiments of apparatus adapted to produce a continuous detonation are described in British Pat. No. 1,069,127 and U.S. Pat. No. 3,588,298 and consist generically of an endless combustion chamber or "channel" with passages in its walls through which the fresh mixture can be passed and products of detonation extracted. Such devices may run on a variety of fuels, including liquid hydrocarbons, and may use oxygen-enriched or heated air as the oxidiser. In the specifications mentioned above, the channel is a circular annulus and a stable system may be established consisting of one or more waves which continually rotate round the channel.

The conditions under which stable systems can be obtained depend critically on the ratio of inlet and exit passage area to channel diameter, termed "Lateral Relief", and on the composition, temperature and pressure of the mixture passed into the device. These may be established by calculation and experiment.

In the embodiments of this invention continuous rotating detonation wave devices are arranged so that power may be extracted gas dynamically from the gaseous products as a laser beam.

BRIEF DESCRIPTION OF THE DRAWINGS

Embodiments of this invention are illustrated, merely by way of example, in the accompanying drawings in which:

FIGS. 4, 5 and 6 illustrate diagrammatically other embodiments using various configurations of laser cavity and gas producing apparatus.

DESCRIPTION OF PREFERRED EMBODIMENTS

Figure 1A:
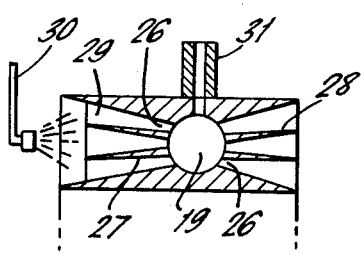
FIGS. 1a, 1b and 1c are diagrammatic sectional views of two embodiments of apparatus adapted to produce combustion gases by maintaining at least one continuously moving combustion initiating detonation wave in a combustion chamber.
Figure 1B:
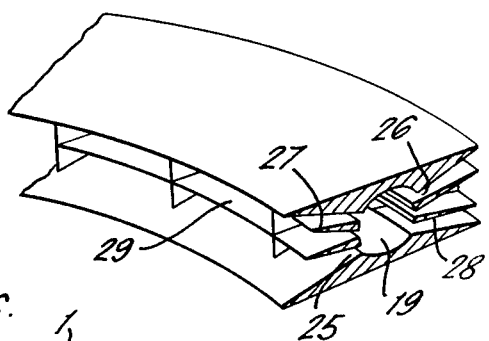

Referring to FIG. 1, combustion chambers capable of supporting continuously moving detonation waves are already known, for example from our published British Pat. No. 1,069,217 and U.S. Pat. No. 3,588,298. FIGS. 1a and 1b show the general configuration of the type described in British specification No. 1,069,217, in which combustion chamber 19 is provided with a number of permanently open, slit-like inlet and outlet ports 25,26 respectively. Baffles 27,28 respectively separate the flows passing through the inlet and outlet ports, and form conduits, such as the conduit 29.

Such a combustion chamber would be used in conjunction with a compressor or fan which would supply gaseous reactants (e.g. air) to the combustion chamber 19.

A fuel injector 30 is mounted immediately upstream of the inlet conduits 29 for the supply of an atomised liquid fuel (e.g. kerosene) which is entrained in the flow of compressed gases.

Alternatively, the combustion chamber 19 could be supplied with a mixture of gaseous fuel and a gaseous oxidant.

A detonation starter 31 (e.g. a high-tension electrical igniter), communicates with the combustion chamber 19 so as to start a combustion initiating detonation wave.

Figure 1C:
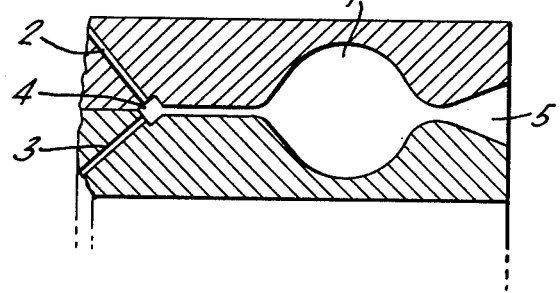

FIG. 1c is a diagrammatic section through another type of combustion chamber capable of supporting a rotating detonation wave. It is generally of the same type as that described in U.S. Pat. No. 3,583,298.

Toroidal or aerodynamically shaped detonation channel 1 has annular inlet ducts or slits 2,3 supplying fuel and oxidant respectively to a mixing chamber 4, where the fuel and oxidant are pre-mixed before passing through a single annular inlet slit duct to channel 1. In the channel, ignition is caused by means not shown, such as a high tension igniter. Combustion gases expand through annular slit nozzle 5.

Figure 2:
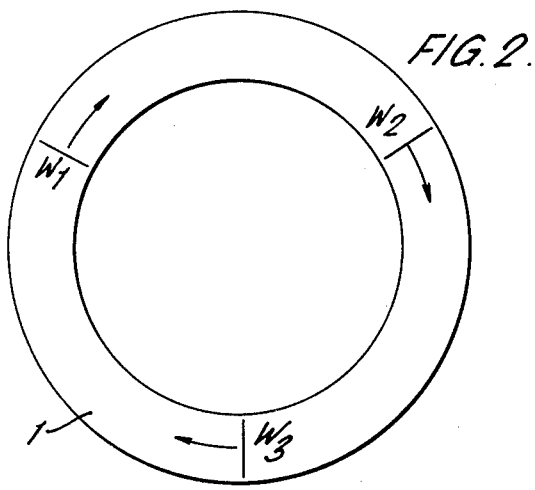
FIG. 2 illustrates a possible circulating series of detonation waves.

By suitable choice of the size of inlet and outlet apertures and the rate of supply of the fuel and oxidant, one or more (preferably several) detonation waves $W_1$, $W_2$, $W_3$ may be maintained in an endless detonation channel. Such a system of detonation waves is shown diagrammatically in FIG. 2.

Figure 3B:
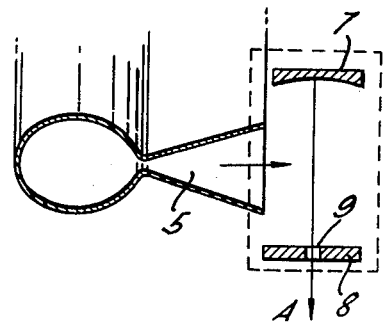
FIGS. 3a, 3b and 3c show diagrammatically how the apparatus may be adapted to produce a beam of coherent radiation by the addition of a laser resonator.
Figure 3A:
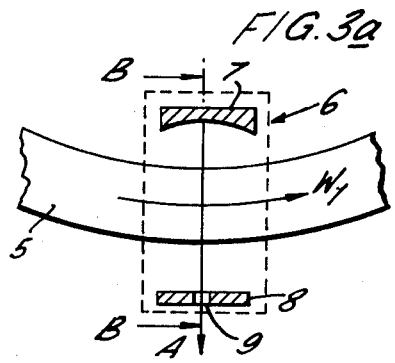

In FIG. 3a a gas-dynamic laser scheme is shown in which detonation products from the detonator channel 1 are supersonically expanded through a convergent-divergent nozzle 5 into a laser resonator structure 6 provided with mirrors 7,8 whose optical axis A is perpendicular to the direction of travel of the wave. Mirror 8 has a small hole 9 through which the laser beam is propagated. FIG. 3b shows the view on section B in FIG. 3a. It should be noted that channel 1 could have a plurality of nozzles 5, or nozzle equivalents such as aerodynamically shaped blades as described in our U.S. Pat. No. 3,899,794.

In constructing a laser resonator it is an advantage to have a large ratio of length to diameter of the resonator. A preferred system is therefore to dispose the axis of the resonator in the same direction as that of wave travel.

In FIG. 4, the detonation channel 10 is of "racetrack" shape, having long straight sides 10a,10b. The laser cavity with mirrors 12,13 is arranged to have its optical axis 11 coincident with the longitudinal axis of straight channel portion 10b. In this case, in which it is desired to induce lasing in the gases within the channel, the gas within the resonator structure has a composition which varies from behind the detonation wave along the rarefaction wave to the start of the next detonation wave. It is desirable to arrange for a population inversion over as much of this region as possible and to avoid any region in which the laser emission is too strongly absorbed. However, as distinct from the transverse-resonator case, if several waves are present in the cavity at any time, the properties averaged along the cavity will be substantially constant.

In the gas-dynamic laser case, where the products of detonation are supersonically expanded to produce laser emission, the optical axis 11 of the laser cavity would be parallel to the longitudinal axis of the straight channel section 10b and situated in the exhaust gases issuing from a convergent-divergent nozzle. In order to obtain an even greater ratio of resonator length to diameter, the outputs from several channels or several sections of a continuous channel may be discharged into the resonator region. An arrangement of a channel to do this is shown in FIG. 5, where it will be seen that channel 6 has four straight portions 16a, b, c, and d, and is provided with expansion nozzles round its periphery. Mirrors 14 are provided to produce an optical path 17 passing through the outwardly expanding exhaust gases E from all four sides 16a, b, c, and d. Mirror 15 is either partially reflecting or provided with a hole so that the output beam may escape. Such a laser cavity averages the optical emissions of all the exhaust gases passing through its active portion.

Figure 6A:
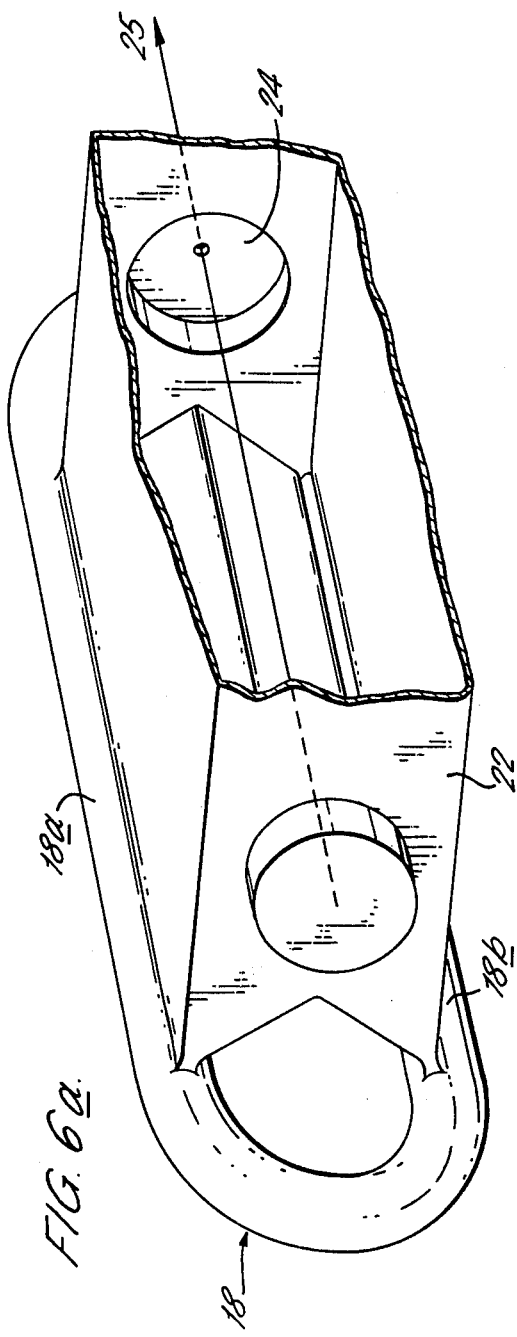
Figure 6C:
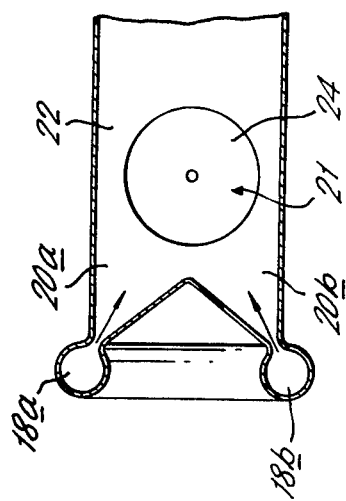
Figure 6B:
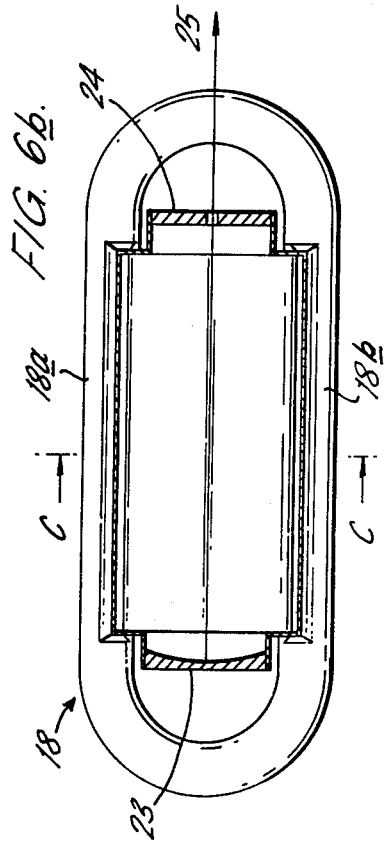

FIG. 6a is a schematic perspective view of a gas dynamic laser which makes use of combined exhaust flows from straight channel sections 18a, 18b of a "racetrack" shaped detonation channel 18. FIG. 6b is a section taken in a plane which includes laser optical axis 25 and is parallel to the plate which contains the longitudinal axes of the straight channel sections. FIG. 6c is a further sectional view taken on line 'C—C' in FIG. 6b. Straight channel sections 18a, 18b have nozzles 20a, 20b arranged to discharge inwardly and convergingly, so that a region of combined flow is formed at 21. Optical cavity 22 having mirrors 23,24 is arranged with its optical axis 25 in the longitudinal direction of the region of combined flow and in the area of optical activity. If conditions are suitable, a laser beam will be propagated along axis 25.

The fuel mixture fed into a device constructed according to any of the above embodiments or variations and combinations thereof, must be capable of sustaining a continuous rotating detonation wave and also produce gaseous products which are of a suitable composition for laser action.

In the specification of our U.S. Pat. No. 3,899,794, gas-dynamic lasers using diverted combustion products of gas turbine engines are discussed. In aviation gas turbine engines the fuel is aviation kerosene, and it is shown in the said specification that the proportions of the constituents of the combustion products are generally close to those required for a high power gas dynamic laser. By altering the air/fuel ratio, or injecting an extra substance or substances (such as carbon monoxide) into the combustion gases, it is shown that the proportions of the constituents of the combustion gases may be adjusted to fall within the required limits for high power lasing. Table I shows how the combustion products of an air/fuel ratio of 75:1 compare with those required for lasing.

TABLE I

| Constituent | Status | Typical % composition of Comb. products of an Aviation Gas Turbine Comb. Chamber for Approx. 75: 1AFR* | Molar % of a mixture required to support high power laser action |
|---|---|---|---|
| $N_2$ | Energy Pump | 76.99 | 70–90% |
| $CO_2$ | Lasing species | 2.79 | 5–25% |
| CO | Low efficiency Energy Pump | 0 | 5% |
| $H_2O$ | Beneficial in small quantities | 2.75 | Up to 15% may be tolerated provided nozzle design is suitably adjusted |

*AFR = Air Fuel Ratio

A very wide range of both gaseous, liquid, and even solid (at room temperature) hydrocarbon fuels may be burnt to produce combustion products which have compositions within or near the range desirable to support gas dynamic lasing. Table II shows some fuels and their combustion products after stoichiometric combustion with air.

TABLE II
PRODUCTS FROM STOICHIOMETRIC COMBUSTION WITH AIR OF VARIOUS HYDROCARBONS

| Fuel | | % $N_2$ | % $CO_2$ | % $H_2O$ |
|---|---|---|---|---|
| Methane | $CH_4$ | 72.7 | 9.1 | 18.2 |
| Ethane | $C_2H_6$ | 73.7 | 10.5 | 15.8 |
| Propane | $C_3H_8$ | 74.1 | 11.1 | 14.8 |
| Butane | $C_4H_{10}$ | 74.3 | 11.4 | 14.3 |
| Pentane | $C_5H_{12}$ | 74.4 | 11.7 | 13.9 |
| Octane | $C_8H_{18}$ | 74.6 | 11.9 | 13.5 |
| Ethylene | $C_2H_4$ | | | |
| Propylene | $C_3H_6$ | 75.0 | 12.5 | 12.5 |
| Kerosene | $C_{12}H_{24}$ | | | |
| Xylene | $C_8H_{10}$ | 76.4 | 14.5 | 9.1 |
| Toluene | $C_7H_8$ | 76.6 | 149 | 8.5 |
| Acetylene | $C_2H_2$ | | | |
| | | 76.8 | 15.3 | 7.7 |
| Benzene | $C_6H_6$ | | | |
| Naphthalene | $C_{10}H_8$ | 77.4 | 16.2 | 6.4 |

It is apparent that no hydrocarbon fuel can be absolutely excluded from consideration as capable of fueling a combustion-driven gas dynamic laser device, although some would obviously be more convenient to use than others, having regard to problems of fuel handling and storage, ignitability, combustion temperature, ease of attaining complete combustion, or the need for the use of additives to bring the proportions of the constituents of the combustion products into line with those required for lasing.

In distinction to the disclosure of the abovementioned Application, in which the "as produced" composition of the gas turbine combustion gases is dictated by the design requirements of the complete gas turbine engine, the detonation channel of the present invention and its fuel and oxidant feeds can be designed and selected from the start to produce combustion products which are suited to the support of gas dynamic laser action. It could of course be desirable in some circumstances to have a facility for injecting additional substances into the combustion gases in order to adjust their composition, but TABLE III gives examples of detonation stoichiometric combustion of kerosene with air and ethylene with air in which no such adjustment is necessary.

TABLE III

| Constituent | Status | Detonation Products of (stoichiometric) Kerosene Air or Ethylene Air | Molar % of a mixture required to support high power laser action |
|---|---|---|---|
| $N_2$ | Energy Pump | 74.5 | 70-90% |
| $CO_2$ | Lasing species | 10.1 | 5-25% |
| CO | Lower Efficiency Energy Pump | 3.5 | <5% |
| $H_2O$ | Beneficial in small quantities | 11.9 | <15% |

The lasing species of gas in Tables I and III is $CO_2$, but a number of other gas species have been made to lase, including CO, $N_2O$, HF, DF (Deuterium Fluoride) and $H_2O$, but there are many more which could work. Theoretical consideration of the data available indicates likely systems, but experimental feasibility studies are always necessary.

In the correct proportions, a wide variety of gases can be detonated, and some mixtures which can be made to detonate and which have been shown to have, or would be expected to provide, a lasing species include $CO + O_2$, $CS_2 + O_2$ $C_2N_2 + O_2$, $H_2 + F_2$, $H_2 + Cl_2$, $H_2 + O_2$, $NH_3 + O_2$. In cases where oxygen forms part of the mixture, part or all of this may be supplied as air if the accompanying amount of nitrogen neither prevents a detonation nor laser action.

For a particular fuel-oxidant system it is only possible to support detonation waves in mixtures within a certain range of fuel-oxidant ratios. The compositions of the mixtures at the extremities of this range are referred to as the limits of detonability of the system. Such limits are not predicted by the theory of detonation and have to be determined experimentally. Published values of detonation limits for some systems are presented in Table IV. These limits relate to detonations in tubes and they can be adversely affected if the tube diameter is reduced too far. The range of detonability is also narrowed if part of the tube wall is removed, thereby providing "lateral relief" to the channel, and hence it follows that the rotating detonation wave devices described in this specification will impose somewhat narrower limits on the ranges of detonability than those shown in the table. However, exact limits can only be determined experimentally and depend on the exact dimensions of the device.

TABLE IV

| Mixture | % Fuel in air or $O_2$-Detonability Limits | |
|---|---|---|
| | Lower Limit | Upper Limit |
| $H_2 + O_2$ | 15 | 90 |
| $H_2 + $ Air | 18.3 | 58.9 |
| $CO + O_2$ | 38 | 90 |
| $CO + O_2$ (dried) | — | 83 |
| $(CO + H_2) + O_2$ | 17.2 | 91 |
| $(CO + H_2) + $ Air | 19 | 58.7 |
| $NH_3 + O_2$ | 25.4 | 75.4 |
| $C_3H_8 + O_2$ | 3.2 | 37 |
| $C_4H_{10} + O_2$ | 2.8 | 31.1 |
| $C_2H_2 + O_2$ | 3.5-3.6 | 92-93 |
| $C_2H_2 + $ Air | 4.2 | 50 |
| $C_4H_{10}O$ (ether) $+ O_2$ | 2.6-2.7 | >40 |
| $C_4H_{10}O + $ Air | 2.8 | 4.5 |

In the device described in U.S. Pat. No. 3,588,298, typical operating conditions using ethylene were as follows:

Inlet Mixture — 9% $C_2H_4$ (Ethylene) + 27% $O_2$ + 64% $N_2$ (percentages by volume)
Inlet Temp. — 288° K
Inlet Pressure — Oxidant 60 lbs/sq. in. (3000 torr); Fuel 30 lbs/sq. in. (1500 torr)
Peak Channel Pressure — 150 lbs/sq. in. (7500 torr)
The cross-sectional details for the channel were:
Channel Diameter $(h_c) = 0.250$ inches
Exit Slit Height $(h_e) = 0.040$ inches
Inlet Slit Height $(h_i) = 0.013$ inches
More generally, these measurements can be expressed as ratios, which may be taken as parameters for the construction of other channels, Thus, $$h_c/h_i + h_e = 5$$

$$h_i/h_e = 0.3$$

In order to fully exploit the excess vibrational energy of detonation product molecules to assist gas dynamic lasing of the present invention, it would be necessary to operate a detonation channel at low pressures. This could be done, for a limited period of operation of the detonation channel, by letting the detonation products exhaust from the channel into a pre-evacuated dump tank.

In studying detonation waves (without laser applications in mind), Russian experimenters have used such a technique and have succeeded in maintaining a series of stable detonation waves in premixed hydrogen-oxygen mixtures. Channel pressures were 10-15 torr pre-detonation and 43 torr post-detonation. Details of these experiments are given in an article in Zh. Prik. Mekhan i Tekhn. Fiz. (Journal of Applied Mechanics and Technical Physics) No. 3 pp. 157-164, published 1960 under the authorship of B. V. Voitsekhovskii, and also in an article in Fizika Goreniya i Vzryva Vol. 1, No. 4, pp. 20-23, published 1965, under the title "Study of Continuous Detonations in an Annular Channel" by V. V. Mikhailov and M. E. Topchiyan.

There appears to be no reason why it should not be feasible to operate detonation wave devices at even lower channel pressures. For instance, hydrogen-fluorine-diluent mixtures are more energetic than the hydrogen-oxygen mixtures used in the Russian experiments.

Constraints on detonation channel design and operating conditions described in this specification obviously do not apply if it is desired to use detonation channels to power pure gas-dynamic lasers. In the latter case, the detonation channel is designed instead to give maximum detonation product output through the expansion nozzle(s) at required temperature and pressure for high power lasing.

Figure 3C:
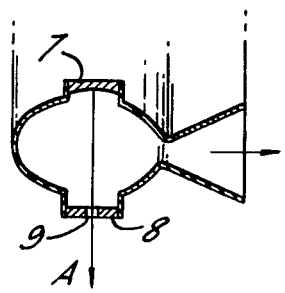

It is envisaged that apparatus constructed according to the principles outlined in this specification would be capable of producing high-power beams of coherent electromagnetic radiation, and would be able to do so continuously if schemes according to FIGS. 5 and 6 (and possibly FIG. 3) were used. Such continuous wave lasers will have applications in any area that requires a compact, efficient, high-power laser, such as power transmission, industrial applications, triggers to initiate nuclear fusion, and on the battlefield.

We claim:
1. A detonation powered gas dynamic laser comprising:

a circuitous detonation channel having at least one substantially linear portion in the circuit thereof;

means for supplying an explosive mixture to said detonation channel;

means for igniting said mixture to excite at least one detonation wave into circulation around said circuit, the ignition of said mixture producing detonation gases containing a lasing species;

means for maintaining said circulation of said detonation wave for at least one passage around said circuit;

exhaust means for continuously exhausting said detonation gases from said channel, said exhaust means including a supersonic expansion slit nozzle means for producing a population inversion in said lasing species of said detonation gases, said slit nozzle means extending over a substantial proportion of the length of said linear portion of said detonation channel circuit; and laser resonator means receiving said detonation gases from said slit nozzle means for producing lasing in said lasing species, said laser resonator means having at least one optical axis oriented to extend substantially parallel to the lateral extent of said slit nozzle means.

2. A detonation powered gas dynamic laser according to claim 1 in which said circuitous detonation channel has a plurality of substantially linear portions, each of said linear portions being provided with a supersonic expansion slit nozzle means extending over a substantial portion of the length thereof, said laser resonator means having a corresponding plurality of optical axes, each of said axes being oriented to extend substantially parallel to the lateral extent of the respective slit nozzle means, said optical axes together forming a continuous circuitous optical path.

3. A detonation powered gas dynamic laser according to claim 1 in which said detonation channel has a plurality of substantially linear, substantially mutually parallel portions, each of said linear portions being provided with supersonic expansion slit nozzle means extending over a substantial portion of the length thereof for discharging detonation products in a direction which is convergent with respect to the directions of discharge of detonation gases from other linear portions, said laser resonator means comprising a plenum chamber for receiving the detonation gases from said slit nozzle means and having an optical axis oriented to extend substantially parallel to the lateral extent of said slit nozzle means.

4. A method of operating a detonation powered gas dynamic laser having a circuitous detonation channel with at least one substantially linear portion in the circuit thereof, means for supplying an explosive mixture to said detonation channel, means for igniting said mixture to excite at least one detonation wave into circulation around said circuit, the ignition of said mixture producing detonation gases containing a lasing species, means for maintaining said circulation of said detonation wave for at least one passage around said circuit, exhaust means for continuously exhausting said detonation gases from said channel, said exhaust means including a supersonic expansion slit nozzle means for producing a population inversion in said lasing species of said detonation gases, said slit nozzle means extending over a substantial portion of the length of said linear portion of said detonation channel circuit, and laser resonator means receiving said detonation gases from said slit nozzle means for producing lasing in said lasing species, said laser resonator means having at least one optical axis oriented to extend substantially parallel to the lateral extent of said slit nozzle means, said method comprising the steps of supplying an explosive mixture to said detonation channel, igniting said explosive mixture, and controlling the combustion condition in said detonation channel so that the pressures behind said detonation wave fronts are sufficiently low to prevent the equaliberation of the vibrational energy mode of the molecules of the lasing species with the rotational and translational energy modes before passage of the detonation gases through said laser resonator wherein excess vibrational mode energy in said lasing species becomes available in said laser resonator to add to the energy available from the gas dynamically induced population inversion in said lasing species.

* * * * *